United States Patent
Reifenhauser

[11] 3,910,316
[45] Oct. 7, 1975

[54] DOUBLE-WORM EXTRUDER HOUSING

[75] Inventor: Hans Reifenhauser, Troisdorf, Germany

[73] Assignee: Reifenhauser KG, Troisdorf, Germany

[22] Filed: June 20, 1973

[21] Appl. No.: 371,849

[30] Foreign Application Priority Data
June 24, 1972 Germany............................ 2231046

[52] U.S. Cl. ............... 138/171; 29/471.1; 259/104; 425/131
[51] Int. Cl.² ......................... B29F 3/04; F16L 9/18
[58] Field of Search ............ 138/111, 171; 425/204, 425/131, 131.1, 131.5; 259/192, 104; 29/471.1, 483

[56] References Cited
UNITED STATES PATENTS

| 1,108,191 | 8/1914 | Lachman ............................ 138/171 |
| 2,209,290 | 7/1940 | Watts.............................. 29/471.1 X |
| 2,819,517 | 1/1958 | Pursell ................................. 29/483 |
| 3,010,151 | 11/1961 | Dickinson et al................... 138/171 |
| 3,153,990 | 10/1964 | Kunzog........................... 138/171 X |
| 3,696,736 | 10/1972 | Stidli.............................. 425/204 X |

FOREIGN PATENTS OR APPLICATIONS
1,080,430  8/1967  United Kingdom................. 138/171

*Primary Examiner*—Richard C. Queisser
*Assistant Examiner*—Daniel M. Yasich
*Attorney, Agent, or Firm*—Karl F. Ross; Herbert Dubno

[57] ABSTRACT

A liner for a double-worm or double-screw extruder housing having a longitudinal passage having the configuration of a pair of parallel intersecting cylindrical bores having a common chord or secant plane is formed of a pair of mirror symmetrical parallel cylindrical segmental tubes joined along a common chord plane constituting a symmetry plane parallel to the segment axes. The tube segments are butt-welded together at this chord plane and are formed with outwardly open notches at this chord in which the tubes are further joined together by fillet welds, i.e. deposits of weldment (deposit welds). The notches of the segments are disposed opposite one another and are longitudinally spaced apart by distances approximately equal to their longitudinal widths. On opposite sides of the liner the notches are staggered, i.e. where a pair of notches are formed in one transverse plane on one side of the liner, the other side has unnotched abutting faces and vice versa.

2 Claims, 10 Drawing Figures

U.S. Patent  Oct. 7,1975  Sheet 1 of 3  3,910,316

DOUBLE-WORM EXTRUDER HOUSING

FIELD OF THE INVENTION

The present invention relates to a method of making a housing for a double-worm extruder and to a double-screw housing made by this method. More particularly, the invention relates to a double-screw extruder housing hugging an internal liner or sleeve and to a method of making same.

BACKGROUND OF THE INVENTION

The housing of a double-worm extruder has a passage with the configuration of a pair of parallel intersecting cylindrical bores which have a common chord plane. Each bore receives a respective worm which meshes with the worm of the other bore.

Customarily the housing comprises an outer casing fitted with a liner formed of two internally hardened or armored (hard faced) cylindrical tubes which are cut off along a common chord plane and thereafter joined along this plane. Since extremely high pressures coupled with high temperatures are present within such an extruder it is very important that these tubes be joined and aligned securely so that none of the hot resin can enter between the joined tubes. This is generally accomplished by forming the tubes with mating formations sealing along their confronting surfaces, and then fillet welding the two tubes together all along the resulting seam. Fillet-welding alone does not insure a tight enough connection between the two faces of the tubes so that some resin penetration may still occur; the fillet weld may also damage the hard-faced interior of the lining.

Such a liner must then be fitted into the outer housing. This is usually possible because the housing is formed at the chord plane with sufficient room to allow the fillet welds to fit in. Alternatively a two-part housing is clamped around the lining and bolted together. The former system is insufficiently strong as the outer housing does not lie in initmate force-transmitting relationship with the exterior of the lining. The latter system is overly expensive and often also of inedquate strength.

OBJECTS OF THE INVENTION

It is therefore an object of the present invention to provide an improved extruder housing.

Another object is the provision of an improved lining for an extruder.

A further object is to provide an improved method of making such an extruder housing.

SUMMARY OF THE INVENTION

These objects are attained according to the present invention in a system wherein the lining is notched out externally along the interface between the two joined tubes, and fillet welds are provided only in these notched out regions which are spaced along the lining on both sides. The tubes are butt welded together, after provision of means between them (if necessary) to insure their correct alignment.

According to another feature of this invention these notches are of an axial length equal to the spacing between them, and are staggered to either side of the lining.

Such an arrangement can be slipped into the outer housing since the fillet welds do not project beyond the tubes forming the lining. The resistance to shear of the butt weld is added to the resistance to tension of the fillet welds to make a very strong connection and no resin can enter between the two tube segments.

More specifically, the invention comprises a nonsplit or one piece outer casing, which may be cast, having a longitudinally extending passage defined by two overlapping bores having a common secant plane parallel to the axes of the bores, and a lining within this passage consisting of a pair of cylinder segments which are internally armored by any conventional hard-facing technique, e.g. by the deposition or coating with a hard metal alloy or tungsten carbide, or by cladding with a layer of hard metal. The two cylinder segments are symmetrical with respect to a common secant or chord plane and have abutting edge faces parallel to this plane which are butt-welded together to form two internal continuous seams (free from discontinuities). The abutment plane lies parallel to the axes of the cylinder segments. Along the outer portions of the seams the cylinder segments are notched partly through with the notches of the two segments registering with one another to form longitudinally perpendicular to the abutment plane and to the cylinder-segment axes. The fillet welds are deposited solely in these recesses and reach outwardly to at most the outer surfaces of the cylinder segments. Thus the weldment or weld deposits or beads lie wholly within the crooks of the V-section recesses formed by registering pairs of notches of the two cylinder segments. The lining is shrink-fitted into the aforementioned passage so that the entire outer surface of the lining with the exception of the floors of the recesses is hugged by the inner wall of the passage and the outer casing bears upon each seam intermediate the recesses. The recesses have a width parallel to the seams which is substantially equal to the longitudinal spacing between them, the regions between the recesses having only butt-welds as noted. The recesses on opposite sides of the lining (along the abutment plane) are staggered in the longitudinal direction.

DESCRIPTION OF THE DRAWING

The above and other objects, features, and advantages will become more readily apparent from the following description, reference being made to the accompanying drawing in which.

SPECIFIC DESCRIPTION

Figure 1:
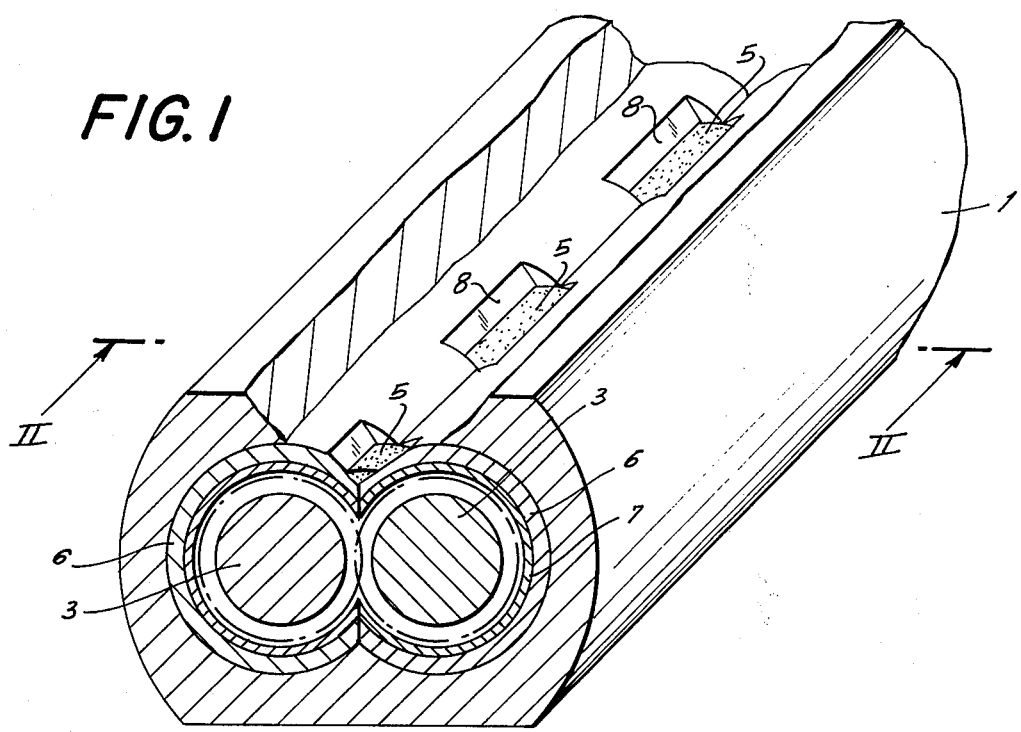
FIG. 1 is a perspective view, partly broken away, of an extruder according to the present invention.
Figure 2:
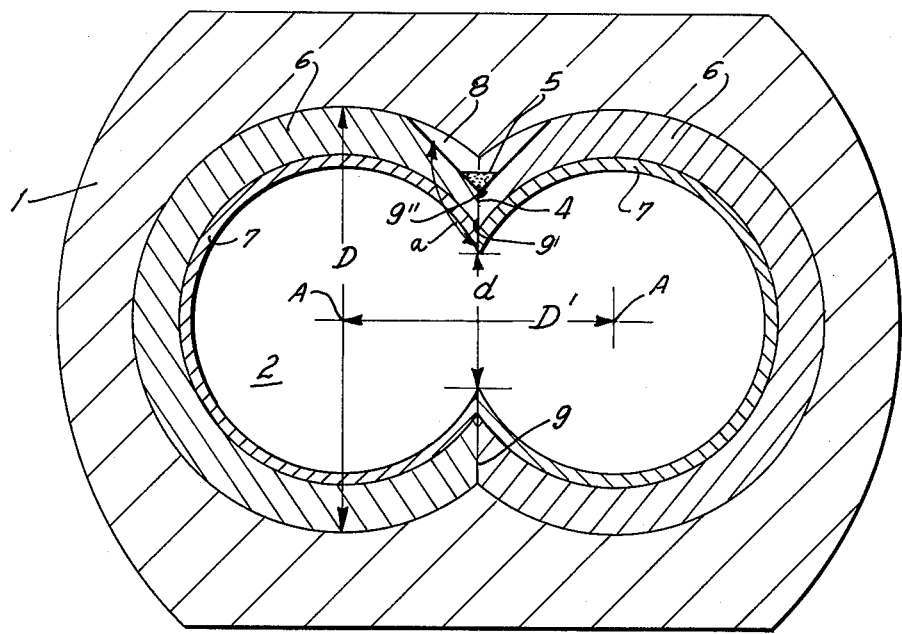
FIG. 2 is a section taken along line II—II of FIG. 1.
Figure 3:
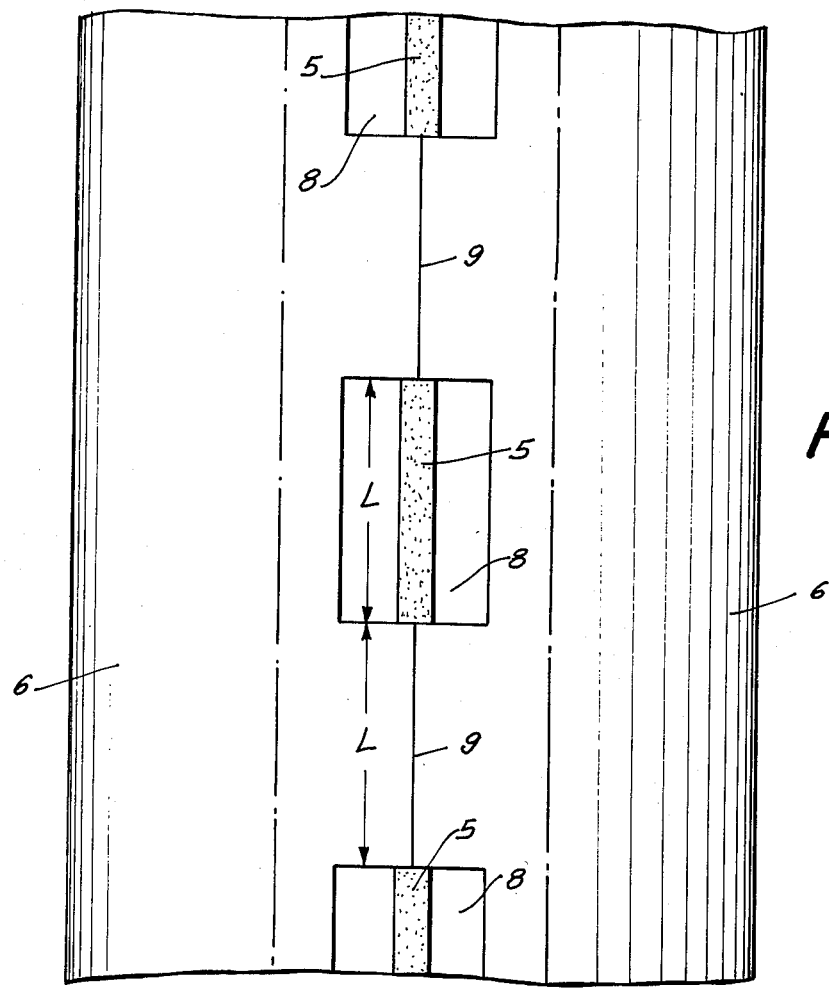
FIG. 3 is a top view of the liner shown in FIGS. 1 and 2.

As shown in FIG. 1 an extruder has a heavy steel housing or casing 1 in which is snugly received a liner formed of two parallel cylindrical tube segments 6 which intersect at a plane 9 extending as a common chord plane between their two axes A, which are spaced apart as shown in FIG. 2 by a distance D' equal to less than the diameter D. Thus the two bores 2 of the tubes 6 communicate through an opening having a height $d$ equal to approximately D/5. Each tube 6 has a hardened inner coating cladding or facing 7 and receives a worm 3 meshing with the worm of the other tube 6 in a manner well known per se.

The tubes 6 are notched out along the plane 9 at regions 8 spaced along their length. In each such V-shaped notch 8, which has a length L and is separated from the adjacent notch 8 by a region having a length L, there is provided a fillet weld 5 which serves to resist separation of the two tubes 6 and has great resistance to tension. In addition the two faces 9' and 9'' of the two tubes are secured together by a butt weld 4 which, as is well known, has considerable resistance to shear. Thus the two tubes are securely joined together, while these fillet welds 5 do not extend outside of their longitudinal projection so that the tubes 6 can be snugly received within the hole of the outer casing 1, i.e. the weldment or weld deposits are disposed wholly within the crotch of the respective V-section recess formed by a pair of notches. The V-notches (see FIG. 4c) on opposite sides of the liner are mutually staggered.

Figures 4A, 4B:
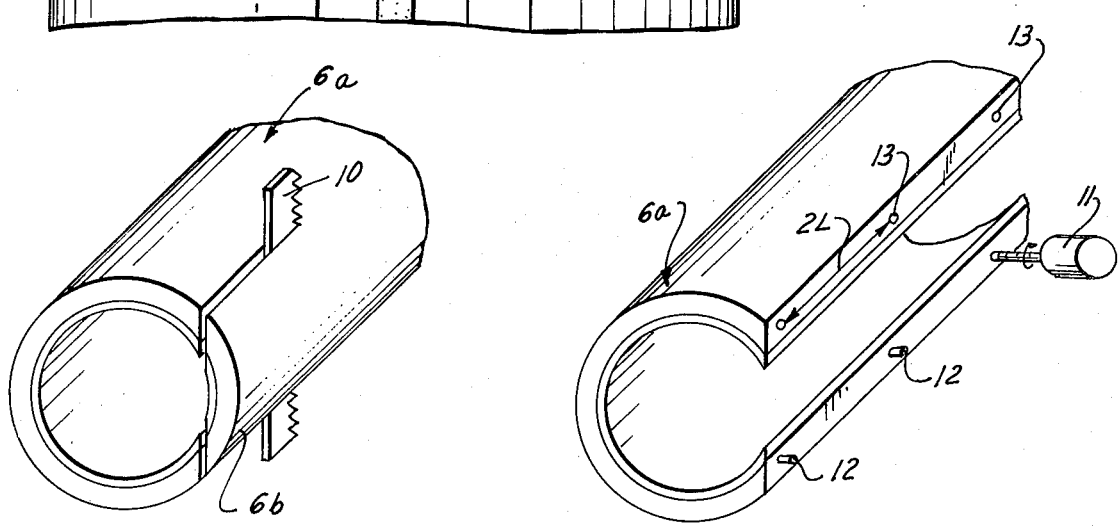
FIGS. 4A–4G are diagrammatic views showing the successive steps in the fabrication of a liner according to this invention.

The liner is made as shown in FIGS. 4A–4G. First as shown in FIG. 4A a saw 10 or the like is used to cut a cylindrical tube 6a along a chord plane to remove from it a section 6b which can be melted down for re-use of its metal. This cutting operation leaves the tube 6a with a pair of smooth planar faces 6a' which, as shown in FIG. 4B are drilled out by a drill 11 and fitted with short cylindrical studs 12 along one side of the tube. These studs 12 and the holes 13 on the opposite face of the tube are spaced apart by a distance equal to 2L and are staggered from one lip of the tube to the other.

Figures 4C, 4D:
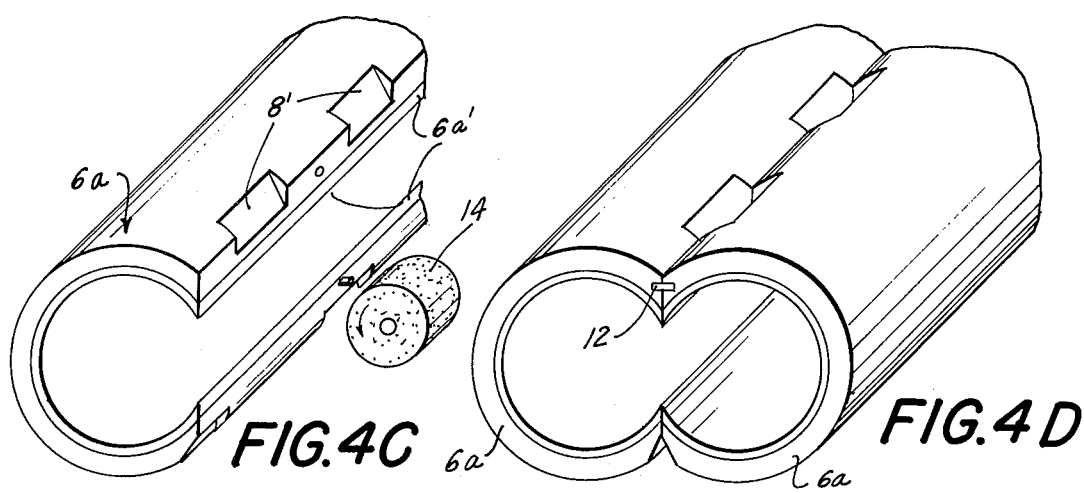

Thereafter as shown in FIG. 4C the tube 6a is notched out with a miller or grinding wheel 14 to have a plurality of bevels 8' along the outside edge on both sides of the surface 6a'. These bevels 8' are cut at an angle $a$ (See FIG. 2) of substantially 135° with the plane 9. Thus the notch formed by two mated tubes has a throat open at 90° and bisected by the plane 9.

The tube 6a is, after internal hard facing by any conventional technique, fitted together with another identical tube 6a as shown in FIG. 4D. One such tube is turned over so that the pins 12 along one edge of one tube 6a fit into the holes 13 of the other tube and the bevels 8' will line up to form notches 8. The pins 12 are arranged on the tubes between the notches 8.

Figures 4E, 4F:
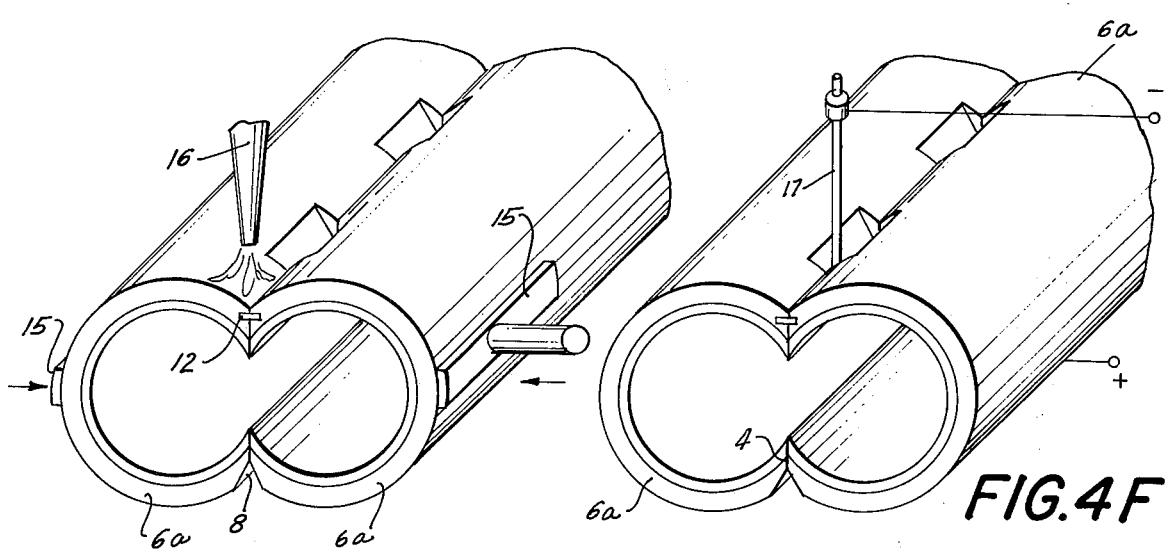

FIG. 4E shows how pressure transverse to the tube axes A is exerted from both sides of the tubes at 15 and heat is directed at the tubes along the plane 9 by torches 16. This action forms a butt weld 4 in a manner described in *Marks' Mechanical Engineers' Handbook* (McGraw-Hill Book Co., N.Y. 1964) on page 13–55.

Figure 4G:
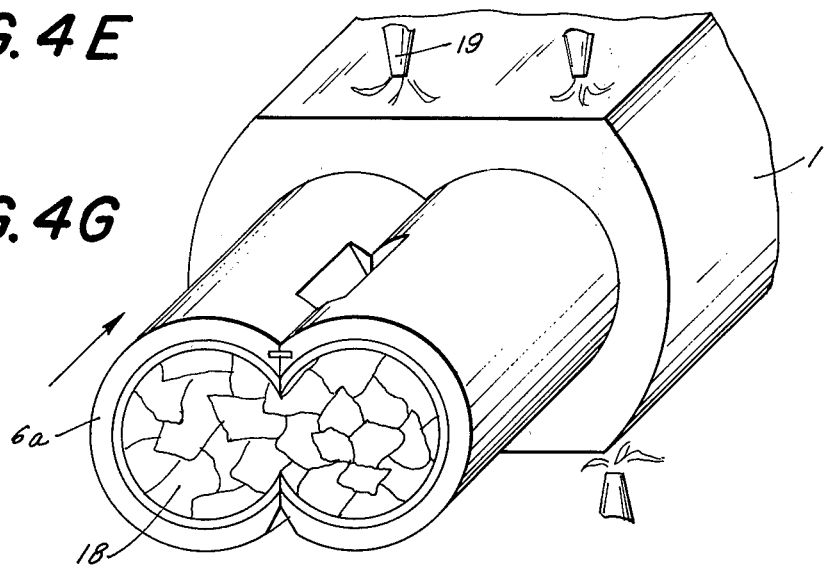

Subsequently an electric-arc welder 17 or the like is used to form the fillet welds 5 as shown in FIG. 4F. The liner so formed is packed with dry ice 18 or similarly cooled as shown in FIG. 4G while the outer housing 1 is heated with torches 19 or the like and the two are then fitted longitudinally together. This shrink-fitting insures a very tight fit of the liner in the housing 1. In fact the two elements can be machined so that the outer dimensions of the liner are the same as the inside dimensions of the outer housing, so that stresses on the liner are communicated to the housing directly.

I claim:

1. An housing for a double-worm extruder comprising:

an outer casing formed with a longitudinal passage having the shape of a pair of intersecting parallel cylinders; and an internally faced liner snugly received in said passage by thermally fitting said liner into said casing, said liner including:

a pair of complementary internally faced tube segments joined together along a common chord plane at two opposite seams longitudinally extending along said liner, said internally faced segments having juxtaposed planar surfaces abutting one another and of full thickness in spaced relation along said seams, said segments being formed externally at said chord plane with longitudinally spaced notches alternating with said abutting surfaces of full thickness and defining abutting regions of reduced thickness, and a fillet weldment in each of said notches, said notches to the one side of said liner being staggered relative to the notches on the other side, said notches being spaced longitudinally apart by a distance generally equal to their longitudinal lengths, the notches being formed by angularly adjoining bevels at the outer edges of the respective abutting surfaces.

2. The housing defined in claim 1 wherein said bevels lie at an angle of substantially 135° to said plane, said notch thereby having sides defining an angle of substantially 90°.

* * * * *